(12) United States Patent
Li et al.

(10) Patent No.: US 11,620,735 B2
(45) Date of Patent: Apr. 4, 2023

(54) METHOD FOR RESTORING VIDEO DATA OF PIPE BASED ON COMPUTER VISION

(71) Applicant: China University of Mining & Technology, Beijing, Beijing (CN)

(72) Inventors: Ce Li, Beijing (CN); Mingcun Liu, Beijing (CN); Feng Yang, Beijing (CN); Xu Qiao, Beijing (CN)

(73) Assignee: CHINA UNIVERSITY OF MINING & TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 17/644,152

(22) Filed: Dec. 14, 2021

(65) Prior Publication Data

US 2022/0292645 A1 Sep. 15, 2022

(30) Foreign Application Priority Data

Mar. 12, 2021 (CN) .......................... 202110268931.X

(51) Int. Cl.
*G06T 7/44* (2017.01)
*G06T 7/13* (2017.01)
(Continued)

(52) U.S. Cl.
CPC .............. *G06T 5/002* (2013.01); *F16L 55/26* (2013.01); *G06F 18/10* (2023.01); *G06T 3/40* (2013.01); *G06T 3/60* (2013.01); *G06T 5/008* (2013.01); *G06T 5/20* (2013.01); *G06T 5/40* (2013.01); *G06T 7/0004* (2013.01); *G06T 7/13* (2017.01); *G06T 7/44* (2017.01); *G06T 7/62* (2017.01); *G06T 7/70* (2017.01); *G06V 10/36* (2022.01); *G06V 10/449* (2022.01); *G06V 10/462* (2022.01); *G06V 10/48* (2022.01); *F16L 2101/30* (2013.01); *G06T 2207/10016* (2013.01); *G06T 2207/20061* (2013.01); *G06T 2207/30108* (2013.01); *G06V 2201/07* (2022.01)

(58) Field of Classification Search
None
See application file for complete search history.

(56) References Cited

U.S. PATENT DOCUMENTS 4,887,155 A * 12/1989 Massen .................... D06H 3/08
73/158

FOREIGN PATENT DOCUMENTS

CN 102192911 A * 9/2011

OTHER PUBLICATIONS

Translation of CN-102192911-A Description from Espacenet (Year: 2011).*

(Continued)

*Primary Examiner* — Tyler W. Sullivan
(74) *Attorney, Agent, or Firm* — Hoffman Warnick LLC

(57) ABSTRACT

A method for restoring video data of a pipe based on computer vision is provided. The method includes: performing gray stretching on pipe image/video collected by a pipe robot; processing noise interference by smoothing filtering; extracting an iron chain from the center of a video image as a template for location; performing target recognition on the center of video data by an SIFT corner detection algorithm; detecting ropes on left and right sides of a target by Hough transform; performing gray covering on the iron chain at the center of the video image and the ropes on two sides; and restoring data by an FMM image restoration algorithm.

1 Claim, 4 Drawing Sheets

(51) Int. Cl.
*G06V 10/48* (2022.01)
*G06V 10/36* (2022.01)
*F16L 55/26* (2006.01)
*G06T 3/40* (2006.01)
*G06T 3/60* (2006.01)
*G06T 5/40* (2006.01)
*G06T 5/00* (2006.01)
*G06T 7/62* (2017.01)
*G06T 7/70* (2017.01)
*G06V 10/46* (2022.01)
*G06V 10/44* (2022.01)
*G06T 5/20* (2006.01)
*G06T 7/00* (2017.01)
*G06F 18/10* (2023.01)
*F16L 101/30* (2006.01)

(56) References Cited

OTHER PUBLICATIONS

Chinese Patent Application Serial No. 202110268931.X Office Action dated Oct. 14, 2021, with English translation, 13 pages.
Chinese Patent Application Serial No. 202110268931.X Office Action dated Dec. 9, 2021, with English translation, 7 pages.

\* cited by examiner

Straight line fitting mask image for steel ropes      Straight line fitted image of steel ropes (a) Original image of pipe A   (b) Original image of pipe B (c) Image of pipe A restored by FMM algorithm   (d) Image of pipe B restored by FMM algorithm

METHOD FOR RESTORING VIDEO DATA OF PIPE BASED ON COMPUTER VISION

CROSS REFERENCE TO RELATED APPLICATION

This patent application claims the benefit and priority of Chinese Patent Application No. 202110268931.X, entitled "method for restoring video data of drainage pipe based on computer vision" filed with the China National Intellectual Property Administration on Mar. 12, 2021, the disclosure of which is incorporated by reference herein in its entirety as part of the present application.

TECHNICAL FIELD

The present disclosure relates to the technical field of image and video processing, and in particular, to an image restoration technique based on computer vision, including target detection and straight line detection.

BACKGROUND ART

Detection and repair of pipe defects would be an important part of urban construction, which has become a research hotspot in computer vision. Unfortunately, it is very difficult to obtain high-quality video data of a pipe. At present, pipe detection mainly relies on a pipe robot equipped with a high-definition camera to obtain internal data of a pipe. The mainstream pipe robots on the market are generally pulled by ropes to go forward, and therefore, the ropes will inevitably appear in the video data of pipes. The ropes will seriously interfere with the identification of defects in edge information of a pipe. In view of the above-mentioned problem in the video data of the pipe, the present disclosure focuses on the research of a video data restoration algorithm based on computer vision, in which scale invariant feature transform (SIFT) corner detection is used to recognize a target and Hough transform is used to detect the ropes, and image restoration is performed on the recognized area. This method can effectively eliminate the interference of ropes and an iron chain in the video data of the pipe.

At present, there are some problems in the field of pipe defect recognition, such as interference from a power unit of a robot in video data of a pipe. As a result, in an actual complex pipe environment, defect features of the pipe are easily affected by a change of the power unit, and subsequent pipe detection cannot be performed efficiently, thereby increasing detection costs.

The present disclosure provides a method for restoring video data of a pipe based on computer vision, which is applicable to the field of pipe defect detection and repair.

SUMMARY

In view of the above-mentioned problems in the conventional art, by combining an SIFT corner detection algorithm, a Hough transform straight line detection algorithm, and Telea's fast marching method (FMM) image restoration algorithm in the current computer vision field, the present disclosure provides a method for restoring video data of a pipe based on computer vision. This method can effectively eliminate an interference of a rope power source in the video data of a pipe, thereby improving the quality of the data and significantly enhancing the efficiency of pipe corrosion detection, and the method is applicable to the field of urban drainage pipe maintenance.

To achieve the above effect, the present disclosure provides the following technical solution:

Step (1), a pipe robot is controlled to obtain pipe images/videos in a pipe, and gray stretching and smoothing filtering are performed on the pipe images/videos.

Step (2), a clear frame of data is selected to extract an iron chain from the data as a template.

Step (3), target detection is performed on the iron chain in the center of the pipe in the video data by using an SIFT algorithm to determine a position of the iron chain.

Step (4), ropes on left and right sides of the iron chain are detected by using Hough transform to determine positions of the ropes.

Step (5), pixels with a gray value of 0 are used to cover the located iron chain and ropes.

Step (6), the video data is restored by using Telea's FMM image restoration algorithm.

Step (7), the restored video data is obtained.

The present disclosure has the following advantages: the method can effectively eliminate the interference of the iron chain and ropes in the video data of a pipe, thereby improving efficiency of subsequent pipe defect recognition, and thus having a certain reference value for pipe defect detection.

BRIEF DESCRIPTION OF THE DRAWINGS

The present disclosure will be further described below in conjunction with the accompanying drawings and embodiments.

DETAILED DESCRIPTION OF THE EMBODIMENTS

To make the objective, technical solutions and effects of the present disclosure clearer and more comprehensible, the present disclosure will be described in more detail with reference to the accompanying drawings and embodiments, but these embodiments should not be construed as a limitation to the present disclosure.

Figure 1:
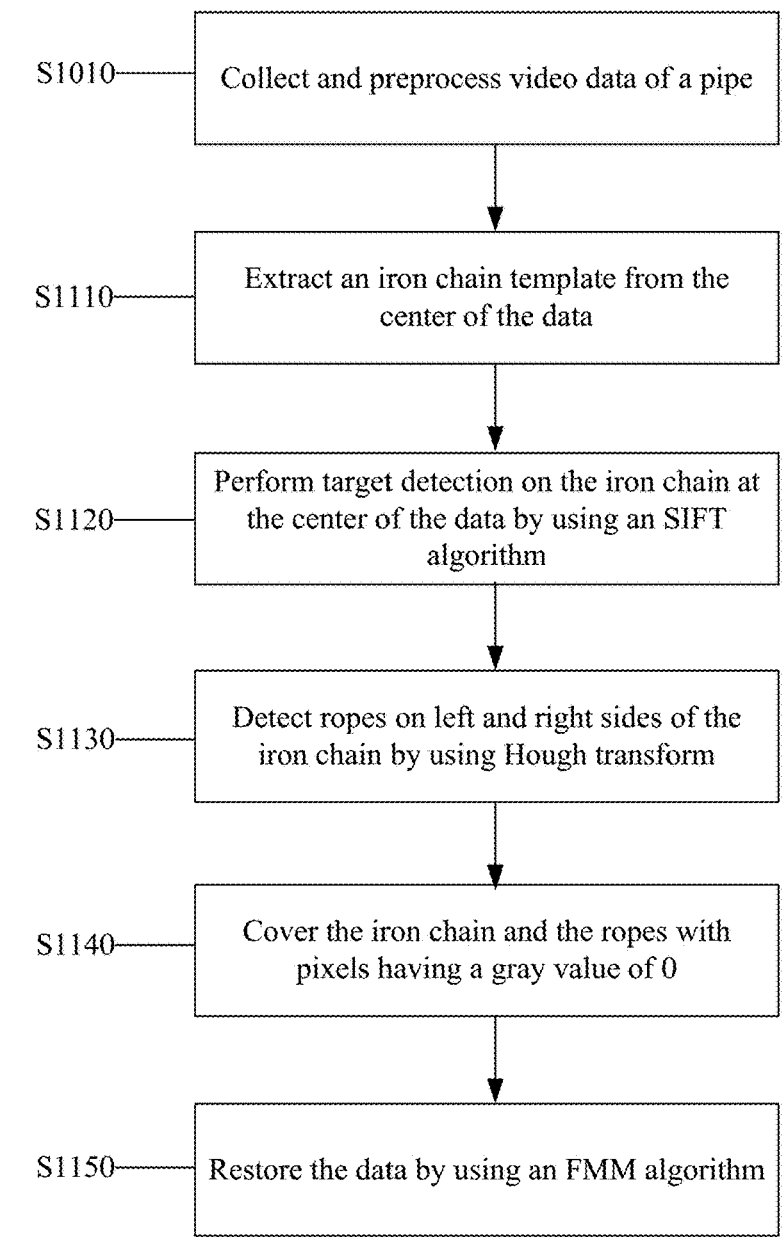
FIG. 1 is a flow chart according to the present disclosure.

As shown in FIG. 1, a method for restoring video data of a pipe based on computer vision provided in the present disclosure is specifically implemented by the following steps:

S1010: a pipe robot with a high-definition camera enters a pipe to collect image/video information of a pipe, and gray stretching is performed on the collected pipe image/video. Contrast of the pipe image is enhanced to make light and shade contrast of the pipe image more distinct and features more obvious. A gray value $f(x,y)$ of each pixel $(x,y)$ in an input image is used as an independent variable of a function, and H denotes a transform operation performed on $f(x,y)$ in the spatial domain to increase or reduce the gray value thereof, and thus a dependent variable is obtained as a gray value g(x,y) in an output image. Equation (1) is specifically as follows:

$$g(x,y)=H[f(x,y)] \quad (1)$$

Figure 2:
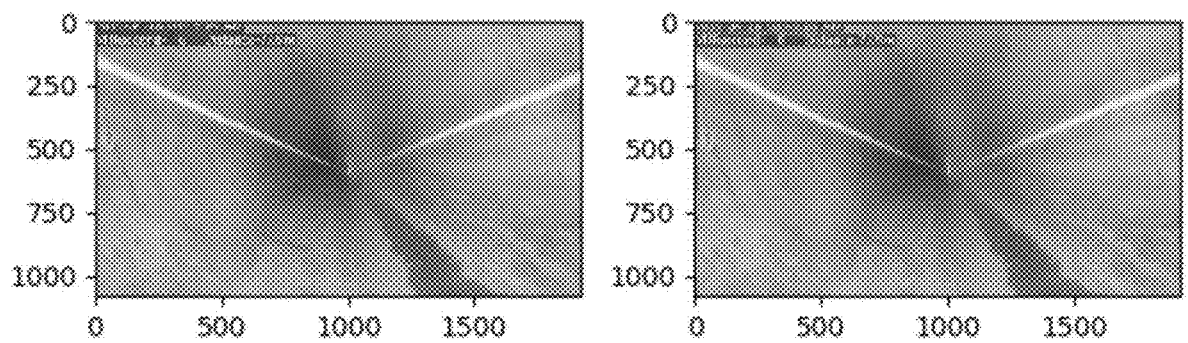
FIG. 2 shows an image showing gray stretching and smoothing filtering according to the present disclosure.

Spatial smoothing filtering enhancement is performed on a gray image by using an adjacent averaging method of a spatial domain method, thereby eliminating jagged contours due to uneven light, local highlighting, and metal reflection caused by a point light source in a real pipe environment. The weight of each pixel is equal in the adjacent averaging method, that is, importance of each pixel is assumed to be the same, and equation (2) is specifically as follows:

$$g(x,y) = \frac{1}{M} \sum_{i,j \in s} f(i,j) \quad (2)$$

where s is a set of pixel coordinates in a neighborhood of (x,y), while (i,j) is coordinates of a pixel in the neighborhood and M is the number of pixels in the set s. A resulting preprocessed image is as shown in FIG. 2.

Figure 3:
FIG. 3 shows an image of an iron chain extracted from video data according to the present disclosure.

S1110: an iron chain is extracted from a center of video data as a template for target recognition. An image of the iron chain is intercepted in the center of the video data image after the image is preprocessed, as shown in FIG. 3.

S1120: target detection is performed on all data by using an SIFT corner detection algorithm, and the iron chain at the center is found and located.

SIFT is short for scale-invariant feature transform, which is a description used in the field of image processing. This description is scale-invariant, which allows detection of key points in an image, and is a local feature descriptor. The SIFT has good stability and invariance, and is adaptable to rotation, scaling, and variable brightness, and capable of avoiding interference of variable viewing angle, affine transformation and noise to a certain extent.

The SIFT algorithm uses a Gaussian kernel function to perform filtering when constructing a scale space, so that an original image preserves the most detail features, and the detail features are gradually reduced after Gaussian filtering to simulate feature representation in a large scale situation. L(x,y,σ) is defined as a convolution operation of the original image I(x,y) and a scale-variable two-dimensional Gaussian function G(x,y,σ).

$$G(x, y, \sigma) = \frac{1}{2\pi\sigma^2} \exp\left(-\frac{(x-m/2)^2 + (y-n/2)^2}{2\sigma^2}\right) \quad (3)$$

$$L(x, y, \sigma) = G(x, y, \sigma) * I(x, y) \quad (4)$$

As shown in equations (3) and (4), (x,y) represents a pixel position in the image, and m, n represent a center of a Gaussian template; σ represents a scale space factor, and the smaller the value of the scale space factor, the less the image is smoothed, and the smaller the corresponding scale; a large scale corresponds to overview features of the image, while a small scale corresponds to detail features of the image; and * represents the convolution operation.

Extreme points are found out based on scale invariance, and a reference direction needs to be assigned to each key point based on local features of the image, so that the descriptor is invariant to rotation of the image. For key points detected in a difference of Gaussian (DOG) pyramid, gradient and direction distribution features of pixels in an adjacent window of a layer of Gaussian pyramid image to which such key points correspond are collected. A module value m(x,y) and a direction θ(x,y) of the gradient are as shown in equations (5) and (6):

$$m(x, y) = \sqrt{(L(x+1), y) - L(x-1, y))^2 + (L(x, y+1) - L(x, y-1))^2} \quad (5)$$

$$\theta(x, y) = \tan^{-1}((L(x, y+1) - L(x, y-1)/(L(x+1, y) - L(x-1, y))) \quad (6)$$

This algorithm uses a gradient histogram statistical method to count image pixels in a particular area with a key point as an origin to determine a direction of the key point. After completing the gradient calculation of the key points, a histogram is used to show the gradients and directions of pixels in the neighborhood. A peak direction of the histogram represents a main direction of the key points, while a peak of a direction histogram represents a direction of a neighborhood gradient at this feature point and a maximum value in the histogram is taken as the main direction of the key points. To enhance robustness of matching, only directions in which peaks are greater than 80% of the peak of the main direction are kept as auxiliary directions of the key points.

Figure 4:
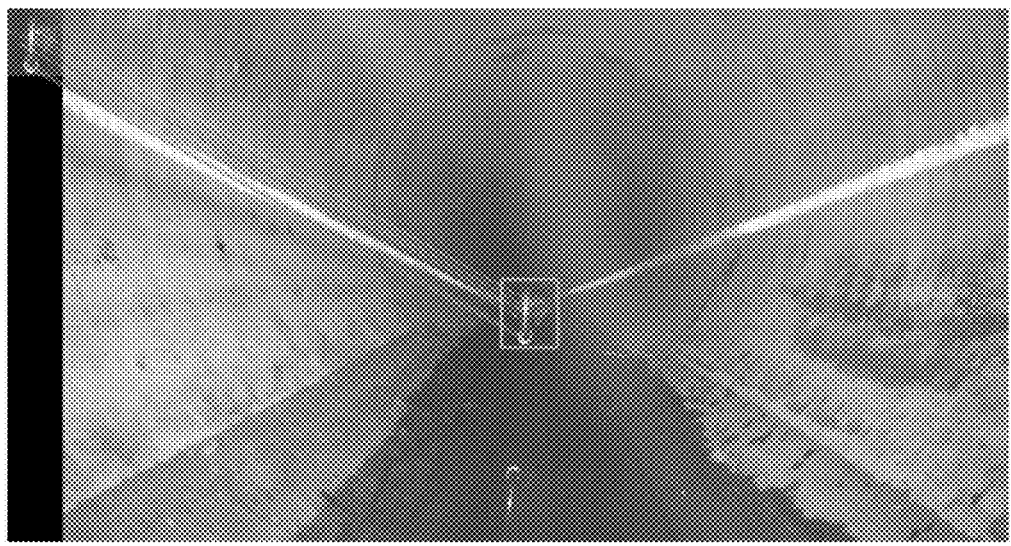
FIG. 4 shows a view of target detection by using an SIFT algorithm according to the present disclosure.

The SIFT corner detection is used to perform target detection on the data, with an effect view of target detection as shown in FIG. 4.

S1130: positions of ropes are detected by using Hough transform after a position of the center of the data is obtained. A main principle is as follows: all straight lines ƒ(x)=kx+b (k representing a straight slope and b representing y-intercept) that possibly pass through each pixel point ($x_0,y_0$) at an edge are mapped into a Hough space, and then appropriate positions are selected. As a straight line perpendicular to x-axis does not have the slope, it cannot be expressed based on the slope, and thus is expressed by a parametric equation r=x*cos(θ)+y*sin(θ), where (x,y) represents a pixel point at an edge, while r represents a distance between a straight line passing through this point and the origin, and θ represents an included angle between r and the positive x-axis. Voting is performed in the Hough space after mapping of each edge point, and 1 is added to a pixel value of the edge point (x,y) every time a straight line equation satisfies this point (r,θ).

Figure 5:
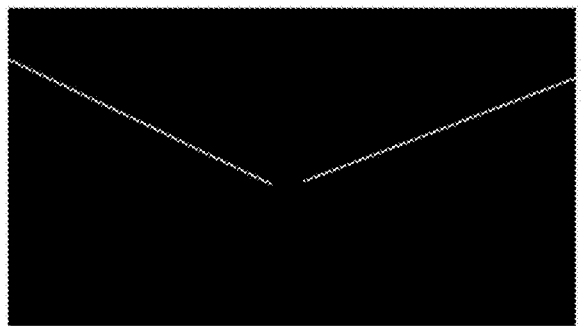
FIG. 5 shows an effect image of ropes detected by using Hough transform according to the present disclosure.
Figure 5:
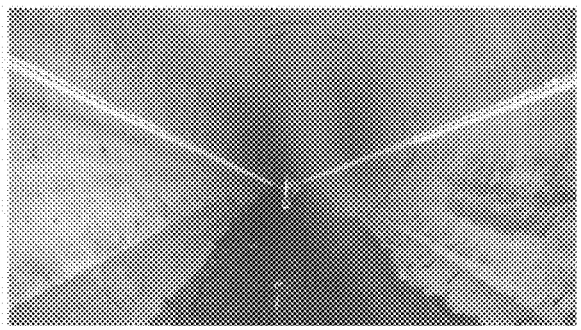

After the ropes are detected by using the Hough transform, the resulting image is as shown in FIG. 5.

Figure 6:
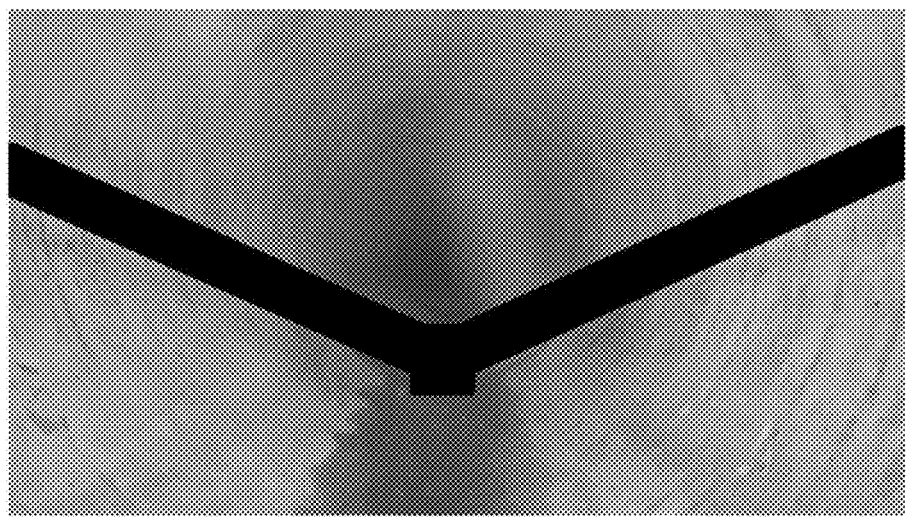
FIG. 6 shows an effect image with an iron chain and ropes covered according to the present disclosure.

S1140: the positions of the central iron chain and the ropes on two sides are obtained after the above two steps. The positions of the iron chain and the ropes are then covered with pixels having a gray value of 0, thereby getting ready for restoration. A resulting image is as shown in FIG. 6.

S1150: the data is restored by Telea's FMM (fast marching method) image restoration algorithm.

Figure 7:
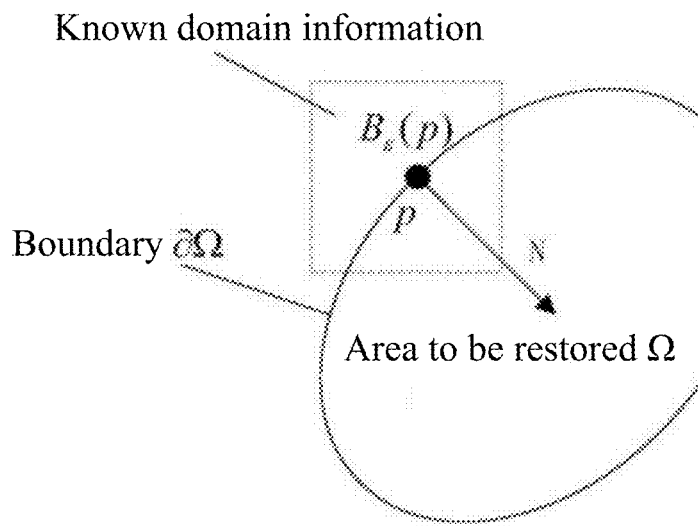
FIG. 7 shows a basic principle of an FMM algorithm according to the present disclosure.

The fast marching restoration algorithm is a fast time-sensitive image restoration method. The basic idea of this algorithm is to start restoration from the edge pixels of an area to be restored, gradually march to the pixels within the area to be restored and finally complete the whole restoration process. Several parameters are defined first: Ω is defined as the area to be restored of the image, and ∂Ω is defined as a boundary where the area to be restored is in contact with an undamaged area. The nature of fast marching is to obtain distances T between all pixel points in the area Ω and the boundary ∂Ω, wherein the distances are positive values when pixel points are in the area to be restored, and the distances are negative values when pixel points are outside the area to be restored; a sequence of marching is determined according to the magnitude of T, and restoration is continued until all pixels within Ω are processed. The basic principle of the FMM algorithm is as shown in FIG. 7.

For a damaged point p in ∂Ω, an area $B_\varepsilon(p)$ with width ε on an outside of the boundary is created, and a gray value of pixel point p in this area is calculated based on the gray values of all known pixel points q according to the following equation:

$$R_q(p) = R(q) + \nabla R(q)(p-q) \tag{7}$$

where R(q) and ∇R(q) represent the gray value and the gradient value of the known pixel point q, respectively; and obviously, the gray value of point p needs to be calculated through substitutions of parameters of all undamaged points in the area $B_F(p)$. These undamaged pixel points in the area have different weights in the whole operation process, and the respective weights are obtained by using a weighting calculation equation (8):

$$R(p) = \frac{\sum_{q \in B_l(p)} w(p,q)[R(q) + \nabla R(q)(p-q)]}{\sum_{q \in B_l(p)} w(p,q)} \tag{8}$$

where w(p,q) represents a weight function for a pixel which is used to determine a contribution of each pixel in the domain $B_F(p)$. w(p,q) refers to an iso-illuminance parameter of the damaged point p and is related to a geometric distance parameter between two points. This processing approach retains an extension of regional image structure data to a certain extent during updating and calculation of parameters of the damaged point p. The function is defined as equation (9):

$$w(p,q) = dir(p,q) * dst(p,q) * lev(p,q) \tag{9}$$

where * represents the convolution operation, dir(p,q) represents a texture direction constraint, dst(p,q) represents a geometric distance constraint and lev(p,q) represents a level set constraint. dir(p,q) reflects correlation between point p and point q in the texture direction, and the more approximate the two points in texture, the greater the weight. dst(p,q) reflects correlation of a geometric distance between point p and point q, and obviously, the smaller this value, the greater the weight. lev(p,q) reflects an influence of information arrival, and the weight is greater when it is closer to known information.

The three constraint conditions are as shown in equations (10):

$$dir(p,q) = \frac{p-q}{\|p-q\|} \cdot N(p)$$

$$dst(p,q) = \frac{d_0^2}{\|p-q\|^2} \tag{10}$$

$$lev(p,q) = \frac{T_0}{1 + |T(p) - T(q)|}$$

where $d_0$ and $T_0$, as a distance constraint parameter and a level set constraint parameter, are generally set to 1. dir(p,q) ensures a greater contribution of a known pixel point of N=∇T when closer to a normal direction, and N(p) represents the texture direction of point p. dst(p,q) ensures a greater weight of a known point closer to damaged point p in gray updating and calculation thereof. lev(p,q) ensures a greater contribution of a known point closer to the boundary outside the same boundary ∂Ω.

A direction of an iso-illuminance curve of the FMM algorithm is updated according to a calculation of a domain T. To ensure that the restoration is started from an initial boundary ∂Ω and to eliminate interference of a large number of irrelevant internal pixels far away from the boundary, a distance domain T needs to be calculated on two sides of the initial boundary ∂Ω. As described above, the gray value of pixel point p is calculated based on the known pixels in the domain $B_\varepsilon(p)$, and then, a set $-T_{out}$ of points outside the boundary is calculated outside the boundary area ∂Ω within a restricted range of T≤ε, and similarly, a set $T_{in}$ of internal points relative to the boundary is calculated inside the boundary area ∂Ω, thereby defining the whole T domain and guaranteeing that the restoration calculation of FMM is performed on a narrow edge with a width of ε on an outside of the boundary ∂Ω. The T domain of the whole image is then defined as:

$$T(p) = \begin{cases} T_{in}(p), \ p \in \Omega \\ -T_{out}(p), \ p \notin \Omega \end{cases} \tag{11}$$

For the value of ε of the selected domain $B_\varepsilon(p)$, 3-10 pixel points are usually selected for a good effect, thereby achieving balance between a restoration rate and a restoration effect.

Figure 8:
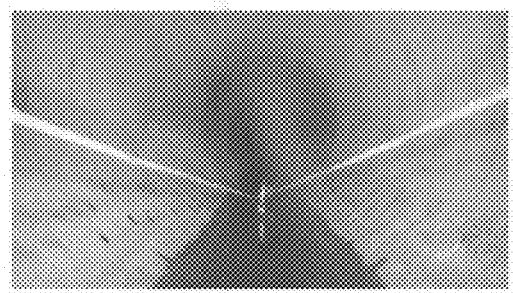
FIG. 8 shows effect images of restored data according to the present disclosure.
Figure 8:
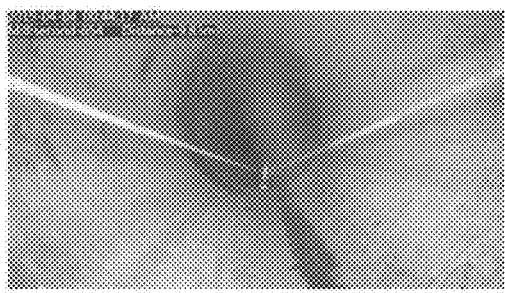
Figure 8:
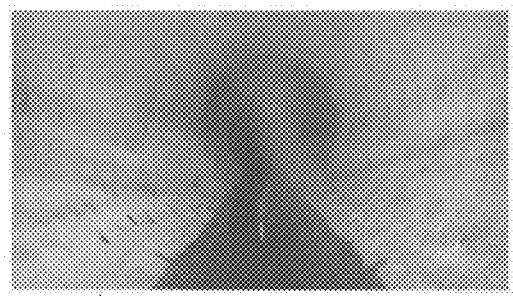
Figure 8:
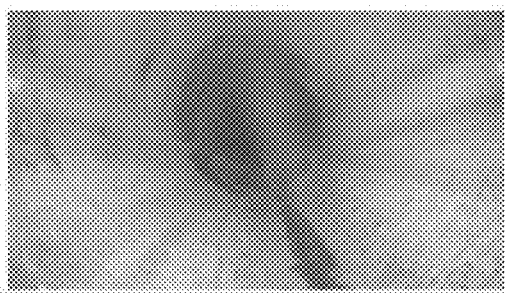

After the image is restored by using the FMM algorithm, the resulting restored image is as shown in FIG. 8.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

What is claimed is:

1. A method for restoring video data of a pipe based on computer vision, comprising:
    step (1): collecting image/video information of a pipe by a pipe robot with a high-definition camera entering the pipe, and performing gray stretching on the collected pipe image/video; enhancing contrast of the pipe image to make light and shade contrast of the pipe image more distinct and features more obvious; wherein a gray value $f(x,y)$ of each pixel (x,y) in an input image is as an independent variable of a function, H denotes a transform operation performed on $f(x,y)$ in a spatial domain to increase or reduce the gray value, to obtain a dependent variable as a gray value g(x,y) in an output image, and equation (1) is as follows:

$$g(x,y) = H[f(x,y)] \tag{1}$$

performing spatial smoothing filtering enhancement on a gray image by using an adjacent averaging method of a spatial domain method, wherein weight of each pixel is equal in the adjacent averaging method, considering that importance of each pixel is assumed to be same, and equation (2) is as follows:

$$g(x, y) = \frac{1}{M} \sum_{i,j \in s} f(i, j) \quad (2)$$

wherein, s is a set of pixel coordinates in a neighborhood of (x,y), (i,j) is coordinates of a pixel in the neighborhood and M is a number of pixels in the set s;

step (2): extracting an iron chain from a center of data as a template for target recognition, and intercepting an image of the iron chain in a center of the video data image after image preprocessing;

step (3): performing target detection on all data by using a scale-invariant feature transform (SIFT) corner detection algorithm to locate the iron chain at the center;

wherein, a Gaussian kernel function is used to perform filtering when constructing a scale space; and $L(x,y,\sigma)$ is defined as a convolution operation of the original image $I(x,y)$ and a scale-variable two-dimensional Gaussian function $G(x,y,\sigma)$, and equations (3) and (4) are as follows:

$$G(x, y, \sigma) = \frac{1}{2\pi\sigma^2} \exp\left(-\frac{(x-m/2)^2 + (y-n/2)^2}{2\sigma^2}\right) \quad (3)$$

$$L(x, y, \sigma) = G(x, y, \sigma) * I(x, y) \quad (4)$$

wherein * represents the convolution operation, (x,y) represents a pixel position in an image; m, n represent a center of a Gaussian template; and σ represents a scale space factor;

for key points detected in a difference of Gaussian (DOG) pyramid, gradient and direction distribution features of pixels in an adjacent window of a layer of a Gaussian pyramid image to which the key points correspond, are collected, wherein, a module value $m(x,y)$ and a direction $\theta(x,y)$ of the gradient are as shown in equations (5) and (6), a function $L(x,y)$, with a same meaning as the equations (4), is defined as the convolution operation of a point (x,y) in the original image and the scale-variable two-dimensional Gaussian function, in the equations (5) and (6), σ is omitted as it is a fixed value and will not change arbitrarily, and the equations (5) and (6) are as follows:

$$m(x, y) = \sqrt{(L(x+1, y) - L(x-1, y))^2 + (L(x, y+1) - L(x, y-1))^2} \quad (5)$$

$$\theta(x, y) = \tan^{-1}((L(x, y+1) - L(x, y-1))/(L(x+1, y) - L(x-1, y))) \quad (6)$$

wherein, a gradient histogram statistical method is used to count image pixels in a particular area with a key point as the origin to determine a direction of the key point; after completing the gradient calculation of the key points, a histogram is used to show the gradients and directions of pixels in the neighborhood, with a peak direction of the histogram representing a main direction of the key points, a peak of a direction histogram representing a direction of a neighborhood gradient at this feature point and a maximum value in the histogram being taken as the main direction of the key points; only directions in which peaks are greater than 80% of the peak of the main direction are kept as auxiliary directions of the key points; and corner detection is used to perform target detection on the data;

step (4): detecting positions of ropes by using Hough transform after a position of the center of the data is obtained, wherein a main principle is as follows: all straight lines $f(x)=kx+b$ that pass through each pixel point $(x_\theta, y_\theta)$ at an edge are mapped into a Hough space, and then appropriate positions are selected, wherein, k represents a straight slope and b represents y-intercept; a straight line perpendicular to x-axis, which does not have the slope and cannot be expressed based on the slope, is expressed by a parametric equation $r=x*\cos(\theta)+y*\sin(\theta)$, wherein (x,y) represents a pixel point at an edge, r represents a distance between a straight line passing through this point and the origin, and θ represents an included angle between r and positive x-axis; and voting in the Hough space after mapping of each edge point, and adding 1 to a pixel value of point (r,θ) every time a straight line equation satisfies this point;

step (5): covering positions of the iron chain and the ropes obtained through steps (3) and (4) with pixels having a gray value of 0; and step (6): restoring the data by using Telea's fast marching method (FMM) image restoration algorithm, wherein a fast marching restoration algorithm is a fast time-sensitive image restoration method, and is adopted to start restoration from edge pixels of an area to be restored, march to pixels within the area to be restored and finally complete a restoration process; several parameters are defined first as follows: Ω is defined as the area to be restored of the image, and ∂Ω is defined as a boundary where the area to be restored is in contact with an undamaged area; nature of fast marching is to obtain distances T between all pixel points in the area to be restored Ω and the boundary ∂Ω, wherein the distances are positive values when pixel points are in the area to be restored, and the distances are negative values when pixel points are outside the area to be restored; a sequence of restoration is determined according to a magnitude of T, and the restoration is continued until all pixels within Ω are processed; for a damaged point R in ∂Ω, an area $B_\varepsilon(p)$ with a width of ε on two sides of the boundary is created, and a gray value of a pixel point p in this area is calculated based on gray values of all known pixel points q according to the following equation:

$$R_q(p)R(q) + \nabla R(q)(p-q) \quad (7)$$

wherein R(q) represents the gray value of the known pixel point q and ∇R(q) represents a gradient value of the known pixel point q; $B_\varepsilon(p)$ these undamaged pixel points in the area have different weights in the whole operation process, and the respective weights are obtained by using a weighting calculation equation (8):

$$R(p) = \frac{\sum_{q \in B_l(p)} w(p, q)[R(q) + \nabla R(q)(p-q)]}{\sum_{q \in B_l(p)} w(p, q)} \quad (8)$$

wherein w(p,q) represents a weight function for a pixel which is used to determine a contribution of each pixel in the domain $B_\varepsilon(p)$; w(p,q) refers to an iso-illuminance parameter of the damaged point p and is related to a geometric distance parameter between two points; this processing method preserves continuous texture of the data of a local area of the image to a certain extent during updating and calculation of parameters of the damaged point p; and the function is defined as equation (9):

$$w(p,q)=dir(p,q)*dst(p,q)*lev(p,q) \qquad (9)$$

wherein * represents the convolution operation, dir(p,q) represents a texture direction constraint, dst(p,q) represents a geometric distance constraint and lev(p,q) represents a level set constraint; dir(p,q) reflects correlation between point p and point q in the texture direction; dst(p,q) reflects correlation of a geometric distance between point p and point q, and a smaller value means that the weight is greater; and lev(p,q) ensures that the known pixel point closer to the contour of an area to be repaired at the point p contribute more to the point p;

three constraint conditions are as shown in equations (10):

$$dir(p, q) = \frac{p-q}{\|p-q\|} \cdot N(p) \qquad (10)$$

$$dst(p, q) = \frac{d_0^2}{\|p-q\|^2}$$

$$lev(p, q) = \frac{T_0}{1 + |T(p) - T(q)|}$$

wherein $d_0$ and $T_0$, as a distance constraint parameter and a level set constraint parameter respectively, are generally set to be 1; dir(p,q) N=∇T and N(p) represents the texture direction of point p; dst(p,q) p lev(p,q) ∂Ω wherein, a direction of an iso-illuminance curve of the FMM algorithm is updated according to a calculation of a domain T; ∂Ω a distance domain T on two sides of the initial boundary ∂Ω is calculated; the gray value of pixel point p as described above is calculated based on the known pixels in the domain $B_\varepsilon(p)$, and then a set $-T_{out}$ of points outside the boundary is calculated outside the boundary area ∂Ω within a range of T≤ε, and similarly, a set $T_{in}$ of internal points relative to the boundary is calculated inside the boundary area ∂Ω, thereby defining the whole T domain and guaranteeing that the restoration calculation of FMM is performed on a narrow edge with a width of ε on two sides of the boundary ∂Ω; and the T domain of the whole image is then defined as:

$$T(p) = \begin{cases} T_{in}(p), \, p \in \Omega \\ -T_{out}(p), \, p \notin \Omega \end{cases} \qquad (11)$$

for the value of ε of the selected domain $B_\varepsilon(p)$, 3-10 pixel points are selected for a good effect.

* * * * *